United States Patent
Kummu (10) Patent No.: US 10,270,749 B2
(45) Date of Patent: Apr. 23, 2019

(54) APPARATUS AND METHOD FOR MANAGING FILES

(71) Applicant: BITTIUM WIRELESS OY, Oulu (FI)

(72) Inventor: Kari Kummu, Oulu (FI)

(73) Assignee: BITTIUM WIRELESS OY, Oulu (FI)

( * ) Notice: Subject to any disclaimer, the term of this patent is extended or adjusted under 35 U.S.C. 154(b) by 241 days.

(21) Appl. No.: 15/173,136

(22) Filed: Jun. 3, 2016

(65) Prior Publication Data

US 2017/0353439 A1    Dec. 7, 2017

(51) Int. Cl.
| | |
|---|---|
| H04L 29/06 | (2006.01) |
| G06F 16/10 | (2019.01) |
| G06F 16/11 | (2019.01) |
| G06F 21/62 | (2013.01) |
| H04L 29/08 | (2006.01) |

(52) U.S. Cl.
CPC .............. H04L 63/08 (2013.01); G06F 16/10 (2019.01); G06F 16/122 (2019.01); G06F 16/125 (2019.01); G06F 21/6218 (2013.01); H04L 67/06 (2013.01); *G06F 2221/2137* (2013.01)

(58) Field of Classification Search
CPC .............. G06F 17/30085; G06F 21/00; G06F 2221/2137; G06Q 10/10
See application file for complete search history.

(56) References Cited

U.S. PATENT DOCUMENTS

| | | | |
|---|---|---|---|
| 7,680,830 B1 * | 3/2010 | Ohr ................... | G06F 17/30085 707/999.2 |
| 2006/0156382 A1 * | 7/2006 | Motoyama .......... | G06F 21/6209 726/1 |
| 2013/0268740 A1 | 10/2013 | Holt | |
| 2016/0026815 A1 * | 1/2016 | Staley ................ | G06F 21/6218 707/785 |

OTHER PUBLICATIONS

Davis (2001). Operating Systems: A Systematic View, 5th edition, Chapter 10, Addison Wesley, ISBN 0-201-61257-7. (Year: 2001).*
European Search Report for corresponding Application No. EP 17 17 2499, 6 pages, dated Aug. 22, 2017.

* cited by examiner

*Primary Examiner* — Brian F Shaw
(74) *Attorney, Agent, or Firm* — FisherBroyles, LLP (57) ABSTRACT

An apparatus includes a file managing application and a device management policy data. The apparatus receives deadline data from a remote administration system. The deadline data including at least one time limit for use of at least one user file stored in the apparatus. The apparatus stores the received deadline data in the device management policy data. The file managing application makes the at least one user file inoperable in the apparatus at and after the time limit defined by the deadline data.

11 Claims, 6 Drawing Sheets

APPARATUS AND METHOD FOR MANAGING FILES

BACKGROUND

Field

The invention relates to an apparatus and a method for managing files.

Description of the Related Art

People have tendency to store their own generated files or the files which have been received from and generated by other users in their computers such as lap-tops, tablets or mobile phones over long periods of time, often for years. The storing of the data requires a lot of memory. Additionally, if such a computer ends up into hands of ill-natured and/or criminal people, the amount of sensitive data lost this way and potentially misused may form a serious security risk.

Hence, there is a need for a better data management.

SUMMARY

The present invention seeks to provide an improvement in the data management. According to an aspect of the present invention, there is provided an apparatus as specified in claim 1.

According to another aspect of the present invention, there is provided a method in claim 10.

The invention has advantages. If the apparatus is lost and contents are compromised, amount of data accessible by outsiders is limited. The user data contents are also deterministically cleaned from obsolete data, and therefore free space is more likely to be available for the user when needed.

BRIEF DESCRIPTION OF THE DRAWINGS

Example embodiments of the present invention are described below, by way of example only, with reference to the accompanying drawings, in which.

DETAILED DESCRIPTION

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

It should be noted that while Figures illustrate various embodiments, they are simplified diagrams that only show some structures and/or functional entities. The connections shown in the Figures may refer to logical or physical connections. It is apparent to a person skilled in the art that the described apparatus may also comprise other functions and structures than those described in Figures and text. It should be appreciated that details of some functions, structures, and the signalling used for management and/or controlling are irrelevant to the actual invention. Therefore, they need not be discussed in more detail here.

In order to meet requirements of classified information, method of managing organization's data on mobile device (laptop or any other computer) is needed. There are many known ways to classify data, and new ways may be invented. The classified information may be divided in the following (British style) levels, for example. The most protected data is top secret and its publication, leakage to even one person outside the authorized people or misuse may cause indispensable damage. Secret data is less important, but still it may not be leaked to unauthorized people because it would cause great damage. Confidential data is important to be kept confidential, and its leakage may be harmful. That restricted data ends up in hands of unauthorized people is undesirable. Official data need not be secret, in principle, but its public spreading may be limited.

Using an MDM (Master Data Management), organization can set expiration dates according to organization guidelines. This provides close to bullet-proof method for ensuring and enforcing organization guidelines. It also reduces risk of user mistakenly violating these guidelines.

Figure 1:
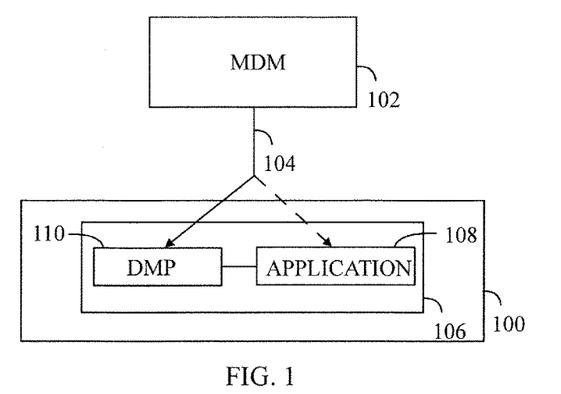
FIG. 1 illustrates an example of an apparatus which receives deadline data from a remote administration system.

FIG. 1 illustrates an example of an apparatus 100 which receives deadline data 104 from a remote administration system 102 (MDM). A non-exhaustive list of the types of the apparatus 100 includes: a personal computer, a tablet computer, a mobile phone, a smartphone, a general-purpose mobile computing device. In an embodiment, the apparatus 100 may be a general-purpose off-the-shelf computing device or a purpose-build proprietary device.

In an embodiment, the apparatus 100 may comprise an electrical battery (not shown in Figures), which may be rechargeable or non-rechargeable, may comprise one or more electrochemical cells that convert the stored energy of chemical form into electrical energy. Instead of a battery, the apparatus 100 may be connectable with a socket for receiving its operation power from the mains electricity or the general-purpose electric power supply.

The deadline data 104 includes at least one time limit for use of at least one user file stored in one or more memories 106 of the apparatus 100. In an embodiment the user file stored in the apparatus 100 is a user generated file. The deadline data 104 defines the latest date the user file is accessible. That a user file is accessible may refer to a possibility for the user of the apparatus 100 to open the user file, modify the contents of the user file, store the user file in same or different folder, rename the user file, and/or delete the user file. After the time defined by deadline data i.e. the time limit, the user file cannot be accessed by the user of the apparatus 100. In an embodiment, after the time limit, the user file may not be accessed by anyone. A user generated file is a file which is created by the user of the apparatus 100 or by another user under the control of the remote administration system 102. A typical example of a user file is a Word-file, a Power Point-file or an Excel-file, for example. The user files may end in .doc .docx, .zip, .txt, .giff, .jpg, .c, .h, .java, .xml or the like. A user generated file may not have a format of an operational system. That is, the type of the user file may not be of type [file name].exe or [file name].dll, for example.

As a step followed by the reception, the apparatus 100 stores the deadline data 104 in the one or more memories 106. The apparatus 100 has a device management policy data 110 stored in the one or more memories 106. The device management policy data 110 includes the deadline data 104 received from the remote administration system 102. The deadline data 104 may be updatable.

The apparatus 100 has also a file managing application 108 which reads the deadline data stored in the one or more memories 106 and makes said at least one user file associated with the a time limit of the deadline data 104 inoperable in the apparatus 100 at and after the time limit defined by the deadline data. That a user file is inoperable means that the user doesn't have access to the user file.

When time limits for access of the user files are transmitted and available for the apparatus 100, the deadline data 104 is updated. Mobile equipment may have a mobile device management policy data. The reception may be wired or wireless.

Figure 2:
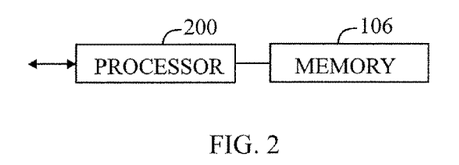
FIG. 2 illustrates an example of at least one processor and at least one memory.

FIG. 2 illustrates an example of the apparatus which comprises one or more processors 200 and the already mentioned one or more memories 106, the one or more memories 106 include, in addition to the deadline data, a computer program code. Thus, at least a part of the computer program code includes the above mentioned file managing application 108.

The one or more memories 106 and the computer program code with the one or more processors 200 may cause the apparatus 100 at least to store the deadline data 104 in the one or more memories 106. Additionally, the one or more memories 106 and the computer program code with the one or more processors 200 may cause the apparatus 100 at least to make said at least one user file inoperable in the apparatus 100 at and after the time limit defined by the deadline data 104.

In an embodiment, the term 'processor' 200 refers to a physical device that is capable of processing data in a computer or other digital electronic device. Depending on the processing power needed, the apparatus 100 may comprise several processors 200 such as parallel processors or one or more multicore processors. A non-exhaustive list of implementation techniques for the processor 200 includes, but is not limited to: logic components, standard integrated circuits, application-specific integrated circuits (ASIC), system-on-a-chip (SoC), application-specific standard products (ASSP), microprocessors, digital signal processors, special-purpose computer chips, and field-programmable gate arrays (FPGA).

In an example embodiment, the processor 200 may be implemented as a microprocessor implementing functions of a central processing unit (CPU) on an integrated circuit. The CPU is a logic machine executing the computer program code. The computer program code may be coded as a computer program using a programming language, which may be a high-level programming language, such as C, C++, or Java, or a low-level programming language, such as a machine language, or an assembler. There are many ways to construct the computer program code In an example embodiment, the operations of the computer program code may be divided into functional modules, sub-routines, methods, classes, objects, applets, macros, etc., depending on the software design methodology and the programming language used. In modern programming environments, there are software libraries, i.e. compilations of ready-made functions, which may be utilized by the computer program code for performing a wide variety of standard operations.

The CPU may comprise a set of registers, an arithmetic logic unit (ALU), and a control unit (CU). The control unit is controlled by the computer program code transferred to the CPU from the working memory 106. The working memory 106 is directly or indirectly connected to the CPU via a memory bus including two buses: an address bus and a data bus. The CPU sends a memory address indicating the desired location of data or computer program code through the address bus, whereupon the CPU reads or writes the data itself from/to the working memory 106 using the data bus.

In an embodiment, the term 'memory' 106 refers to a physical device that is capable of storing the computer program code and data on a temporary or permanent basis for use in the apparatus 100. In an example embodiment, the term 'memory' refers to working memory (also known as primary storage, main memory or internal storage) directly accessible to the processor 200. In an embodiment, the working memory may be implemented as a random-access memory (RAM), such as a dynamic RAM, DRAM. In an embodiment, the non-volatile section of the one or more memories 106 retains the stored information even when not powered. Examples of non-volatile memory include read-only memory (ROM), flash memory, magnetic computer storage devices such as hard disk drives, and optical discs.

In an embodiment, the computer program code may include an operating system and one or more application software, one of which is the file manager application 108. Another of one or more application software is the device management policy data 110. The operating system may be Android, Microsoft Windows, Microsoft Windows Phone, Apple iOS, Linux, or Symbian, for example. In general, the application software includes all the applications that may be run in the apparatus 100.

In an example embodiment, the apparatus 100 comprises a system clock (not shown in Figures) for constantly generating a stream of electrical pulses during operation. The electrical pulses, in turn, cause the various transferring operations within the apparatus 100 to take place in an orderly manner and with specific timing on which the operation of the apparatus 100 is based. The file managing application 108 of the apparatus 100 makes the user file inoperable when the time of the clock matches with the time limit associated with the user file.

Naturally, the apparatus 100 may include a number of other components but they will not be further described because the other components are not required to illustrate the present embodiments.

Figure 3:
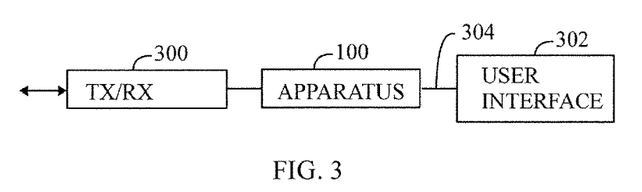
FIG. 3 illustrates an example of the apparatus including or connected to a communication means and a user interface.

In an embodiment illustrated in FIG. 3, the apparatus 100 may comprise or may be connected with a communicating component 300. The communicating component 300 may be a wireless receiver and/or a transceiver. The communicating component 300 may receive the deadline data 104 from a remote administration system 102, and pass the deadline data 104 to device management policy data 110. Physically, the deadline data 104 may be passed to and stored in the one or memories 106 of the apparatus 100.

In an example embodiment, the wireless transceiver may be interoperable with various wireless standard/non-standard/proprietary communication networks such as any mobile phone network, regardless of the generation (such as 2G, 3G, 4G, beyond 4G, etc.) such as GSM (Global System for Mobile Communications), GPRS (General Packet Radio Service), EGPRS (Enhanced GPRS), WCDMA (Wideband Code Division Multiple Access), UMTS (Universal Mobile Telephone System), 3GPP (The 3rd Generation Partnership Project), IMT (International Mobile Telecommunication), LTE (Long Term Evolution, LTE-A (LTE-Advanced), and other radio systems (in their present forms and/or in their evolution forms), such as WLAN (Wireless Local Area Network) based on IEEE (Institute of Electrical and Electronics Engineers) 802.11 standard or its evolution versions (IEEE 802.11ac etc.), WiMAX (Worldwide Interoperability for Microwave Access, or Wi-Fi, for example.

Figure 4:
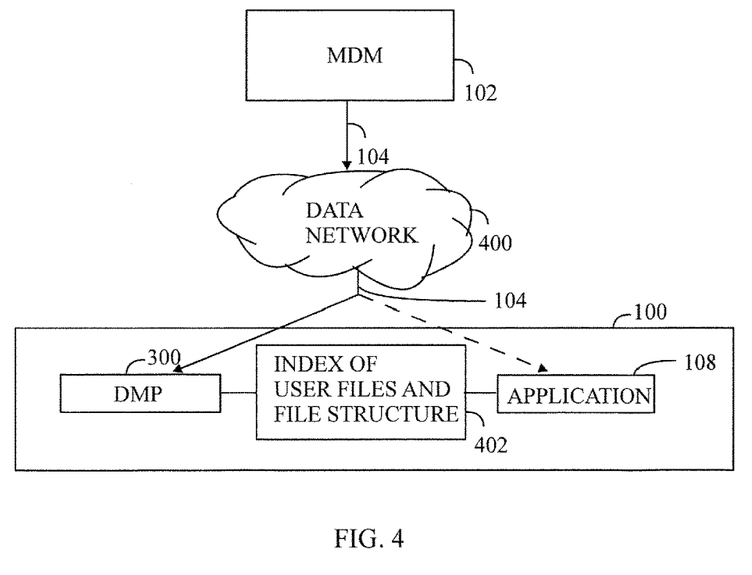
FIG. 4 illustrates an example of a system a part of which the apparatus is.

FIG. 4 illustrates an example of the system. The remote administration system 102, i.e. the MDM administrator, sends deadline data 104 and potentially also other data to a data network 400 which may comprise an IP (Internet Protocol) network, for example. The IP network may comprise an Internet network. Additionally or alternatively, the data network 104 may comprise a radio system network.

The deadline data 104 is received from the data network 400 by the apparatus 100 and it is stored in the at least one memory 106 as the device management data 300. The file managing application 108, which may be run in the background such that the user of the apparatus 100 doesn't notice it is running, may make the at least one user file inoperable at moments defined by the deadline data or by the user generated deadline data. The file managing application 108 has information about the user files in an index of the user files and file structures 402 in the at least one memory 106. The application 108 may be based on java code, for example, without limiting to this code. The file managing application 108 may be deployed on top of the operating system, for example. The whole file managing may be based on a SQL-lite database which is a process library and which is relational database management system. The file managing application may utilize SQL-lite database for maintaining information per file, for example.

In an embodiment, the at least one the time limit is associated with one or more unique user file types. That is, only a part of the user files may have the time limit defined by the deadline data 104.

In an embodiment, the at least one the time limit is associated with one or more specific symbol sequences in the file name. In an embodiment, the user may give the name for the user file in a manner allowed by the device management policy data 110. The device management policy data 110 corresponds to or is in line with that of the remote administration system 102 because the remote administration system 102 controls and defines the device management policy data 110. Thus, although the name of the user file is changed or modified in the apparatus 100, the file managing application 108 can make the user file inoperable at a moment defined by the deadline data 104. Namely, when the user gives a name to or modifies the name of a user file, the file managing application 108 associates a time limit defined by the deadline data with the user file on the basis of the device management policy data 110.

In an embodiment, the at least one the time limit is associated with at least one unique folder structure. Then the file managing application 108 may make inoperable all user files in said unique folder structure. In an embodiment, one or more memories 106 and the computer program code with the one or more processors 200 may cause the apparatus 100 to the make inoperable all user files in said unique folder structure. The unique folder structure may have a unique symbol sequence in its name in a similar manner to the unique file. That is, the at least one time limit is associated with one or more specific symbol sequences in the folder name.

In an embodiment, the at least one the time limit is associated with at least one unique folder type. Then the file managing application 108 may make inoperable all user files in said unique folder type. In an embodiment, one or more memories 106 and the computer program code with the one or more processors 200 may cause the apparatus 100 to the make inoperable all user files in said unique folder type. The unique folder type may have a unique symbol sequence in its name in a similar manner to the unique file. That is, the at least one time limit is associated with one or more specific symbol sequences in the folder name.

In an embodiment, the file managing application 108 may delete said at least one user file in the one or more memories 106 at the time limit defined by the deadline data. The deletion may be performed by writing over the at least one user file with some other data. The other data may include random data.

In an embodiment, the one or more memories 106 and the computer program code with the one or more processors 200 may cause the apparatus 100 to delete said at least one user file in the one or more memories 106 at the time limit defined by the deadline data.

In an embodiment illustrated in FIG. 3, the apparatus 100 may comprise an interface 302. The user interface 302 may implement the exchange of graphical, alphanumeric/symbolic and audio information with the user of the apparatus 100. The user interface may be realized with various techniques, such as a display, means for producing sound such as a loud speaker, for instance. The user interface may also comprise a keyboard, and/or a keypad, for example. The display may be a liquid crystal display, for example, but it may also be implemented by any appropriate technique, such as with a matrix of light-emitting diodes. The display may comprise an active-matrix of organic light-emitting diodes. The display may also incorporate other user interaction means, such as touch input, or haptic feedback, i.e. the display may be a touch screen. The means for producing sound may be a loudspeaker or a simpler means for producing beeps or other sound signals. The keyboard/keypad may comprise a complete (QWERTY) keyboard, a mere numeric keypad or only a few push buttons and/or rotary buttons. In addition, the user interface 302 may comprise other user interface components, for example various means for focusing a cursor (mouse, track ball, arrow keys, touch sensitive area etc.) or elements enabling audio control.

The apparatus 100 may receive user generated deadline data through the user interface 302. The user generated deadline 304 data may include at least one user defined time limit for use and/or access of the one or more user files stored in the apparatus 100. The file managing application 108 may then make said one or more user files inoperable in the apparatus 100 at and after the user defined time limit, if the user defined time limit is at or prior to the time limit of the deadline data 104 received from the remote administration system 102. Thus, the user of the apparatus 100 may deny access to the at least one user file earlier than controlled by the device management policy data 110 and/or the remote administration management 102.

In an embodiment, the one or more memories 106 and the computer program code with the one or more processors 200 may thus cause the apparatus 100 to receive user generated deadline data through the user interface 302, the user based deadline 304 data including at least one user defined time limit for use of the one or more user files stored in the one or more memories 106. The one or more memories 106 and the computer program code with the one or more processors 200 may cause the apparatus 100 then to make said one or more user files inoperable in the apparatus 100 at and after the user defined time limit, if the user defined time limit is at or prior to the time limit of the deadline data 104 received from the remote administration system 102.

In an embodiment, the apparatus 100 may require user authorization prior to allowance of access to the apparatus 100. In an embodiment the authorization is required for the access to data stored in the apparatus 100. In an embodiment the authorization is required for the access to the at least one user file stored in the apparatus 100.

In an embodiment, the one or more memories 106 and the computer program code with the one or more processors 200 may cause the apparatus 100 to require user authorization prior to allowance of access to the apparatus 100. In an embodiment the authorization is required for the access to data stored in the one or memories 106 of the apparatus 100. In an embodiment the authorization is required for the access to the at least one user file stored in the one or memories 106 of the apparatus 100.

Then the apparatus 100 may allow access to the apparatus 100 in response to a reception of a user identification data which fulfils a requirement of the user authorization. The access control process of the authentication checks whether the user identification data approved or disapproved. If the user identification is disapproved, the user has no access to the user files. If the user identification data is approved, the user has access to the user files. That also means that the approved user may generate user files which didn't exist in the apparatus 100 prior to the authentication. The user identification data may be based on a security code, an image of a fingertip or an image of a retina, for example.

In an embodiment, the one or more memories 106 and the computer program code with the one or more processors 200 may cause the apparatus 100 to allow access to the apparatus in response to a reception of a user identification data which fulfils of a requirement of the user authorization. The access control process of the authentication is known, per se, and that is why it is not explained in more detail here.

The apparatus 100 may associate the one or more user files generated by the user subsequent to the user authorization with the user identification. In an embodiment, the one or more memories 106 and the computer program code with the one or more processors 200 may cause the apparatus 100 to associate the one or more user files generated by the user subsequent to the user authorization with the user identification.

Finally, the apparatus 100 may make the one or more user files associated with said user identification inoperable on the basis of the deadline data 104. In an embodiment, the one or more memories 106 and the computer program code with the one or more processors 200 may then cause the apparatus 100 to make inoperable the one or more user files associated with said user identification on the basis of the deadline data 104. Thus, several users of the apparatus 100 may have different time limits to access the user generated files. The different time limits may be based on the fact that different users may have an access to user files which are totally separate from each other because of the different user identification. However, the time limits associated with a user file may be different even if the user file is common to the at least two users.

In an embodiment, the apparatus 100 may make the one or more user files associated with said user identification inoperable on the basis of the user generated deadline data 304.

The MDM administrator, which corresponds to the remote administration system 102, can define and update the policy of the user files. The transfer of the deadline data and other possible data may be wired or wireless. The wireless communication may be performed over the IP tunnel, for example. The policy file of the deadline data 104 may define validity period per file type and all rules may be case sensitive. For example:

| File type | Explanation |
|-----------|-------------|
| t* | All files having file type starting with letter t, like txt. |
| Docx | All files having docx file extension to be removed |
| XYZ3*.* | All files stating with XYZ3 |
| Jpeg | jpeg files are not to be removed |
| * | All files |

Asterisk(*) may be used to define expiration date for all file types.

| Example rules | Explanation |
|---------------|-------------|
| *-valid30 | All other files not specified otherwise to be removed after 30 days |
| *- | Keep all other files not specified |
| * | All other files not specified otherwise to be removed per default value |

The deadline data 104 may also define validity for (sub) folders and policy parameters may be of any type, for example, a path and a parameter. Folder management may have a very limited set of parameters.

| Parameter | Explanation |
|-----------|-------------|
| -r | Recursive, include current folder and it's subfolders |
| -f | Force, ignore files marked busy and remove subfolder even with content |
| -m | Make directory |

Below there are examples of folder management which may be included in the deadline data 104.

| Policy parameter | Explanation |
| --- | --- |
| /home/user/temp * | Content of temp folder |
| /home/user/downloads * -r | Content of download folder and subfolders. |
| /home/user/documents/work -rf | Subdirectories of work folder, but not work folder content is removed |

Below there are further policy rule examples which may be included in the deadline data 104.

| Rule | Explanation |
| --- | --- |
| *XP3*.t* -valid2 | Files like SXP3_readme.txt and 3XP3_BDxray.tiff are to be removed after 2 days |
| Readme.* | All files named Readme are to be removed per default value |
| /home/user/temporary -valid20 | Files in temporary folder will be removed after 20 days, except files user is actively using. This rule does not specify subdirectories. |
| /home/user/temp* -valid22 -rf | Content of temp folder and it's subfolders will be removed after 22 days, ignoring file busy status |
| /home/user/projectX-valid- -m | Create new folder, no removal date set |

Below there are examples of the MDM server 102 messages. The MDM server 102 may query several statuses from the apparatus.

| Query | Explanation |
| --- | --- |
| #amountData | Amount of sensitive data marked for removal. Device shall response using Kb. |
| #amountFile | Number of files marked for removal. |
| #amountBusy | Number of files used actively by user since last data removal date |
| #structReportReq | Request for device to response with file structure |
| #nextDate | Date of next file removal |
| #prevDate | Date of last file removed |

Figure 5:
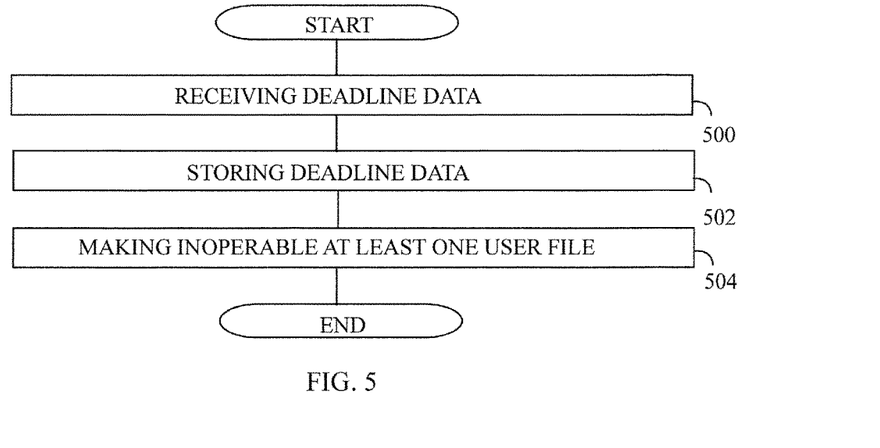
FIG. 5 illustrates an example of a flow chart of the file managing method.

FIG. 5 illustrates an example of a flow chart of the file managing method. In step 500, deadline data 104 from a remote administration system 102 are received, by an apparatus 100, the deadline 104 data including at least one time limit for use of at least one user file stored in the apparatus 100. In step 502, the received deadline data is stored in the device management policy data 110. In step 504, said at least one user file is made inoperable in the apparatus 100, by a file managing application 108, at and after the time limit defined by the deadline data 104.

Figure 6:
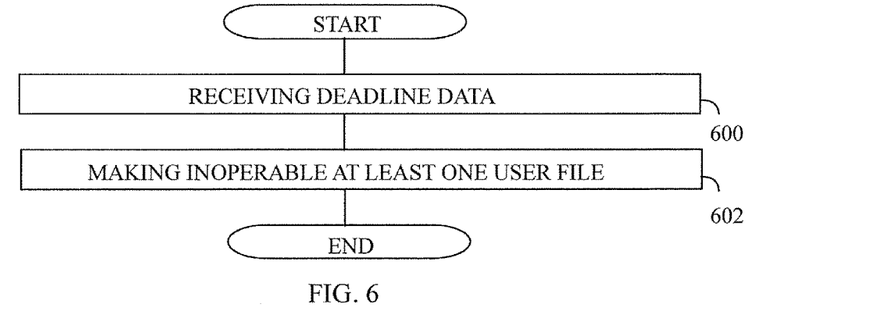
FIG. 6 illustrates an example of a flow chart of the file managing method on the basis of the user generated deadline data.

FIG. 6 illustrates an example of a flow chart of the file managing method on the basis of the user generated deadline data. In step 600, user generated deadline data 304 is received through an interface 302 of the apparatus 100, the user generated deadline data 304 including at least one user defined time limit for use of the at least one user file stored in the apparatus 100. In step 602, said at least one user file is made inoperable in the apparatus 100 at and after the user defined time limit by the file managing application 108, if the user defined time limit is at or prior to the time limit received from the remote administration system 102.

Figure 7:
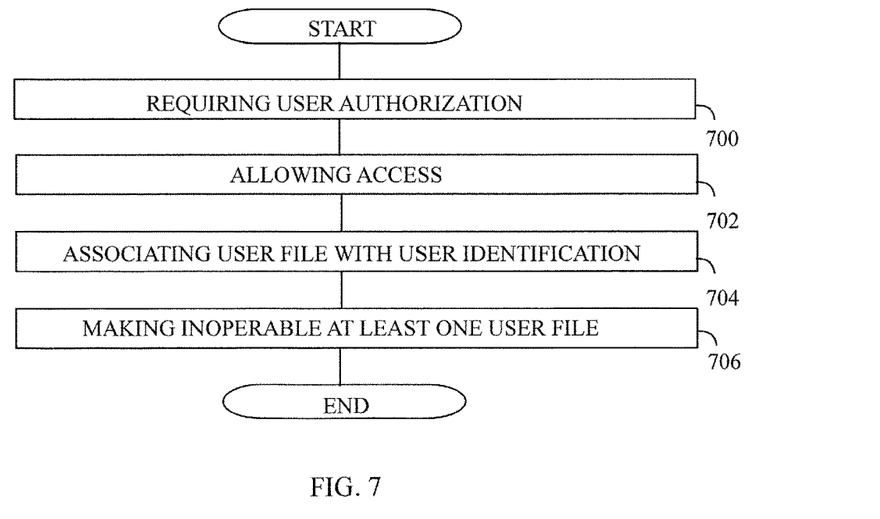
FIG. 7 illustrates of an example of a flow chart of the file managing method on the basis of the user authentication.

FIG. 7 illustrates an example of a flow chart of the file managing method on the basis of the user authentication. In step 700, user authorization prior to allowance of access to the apparatus 100 is required by the apparatus 100. In step 702, access to the apparatus 100 is allowed in response to a reception of a user identification data which fulfils of a requirement of the user authorization. In step 704, the at least one user file generated by the user subsequent to the user authorization is associated with the user identification. In step 706, the at least one user file associated with said user identification is made inoperable on the basis of the deadline data 104.

The method shown in FIGS. 5, 6 and/or 7 may be implemented as a logic circuit solution or computer program. The computer program may be placed on a computer program distribution means for the distribution thereof. The computer program distribution means is readable by the apparatus 100, and it encodes the computer program commands, carries out the operations required to make the at least one user file inoperable.

The computer program may be distributed using a distribution medium which may be any medium readable by the apparatus 100. The medium may be a program storage medium, a memory, a software distribution package, or a compressed software package. In some cases, the distribution may be performed using at least one of the following: a near field communication signal, a short distance signal, and a telecommunications signal.

Figure 8:
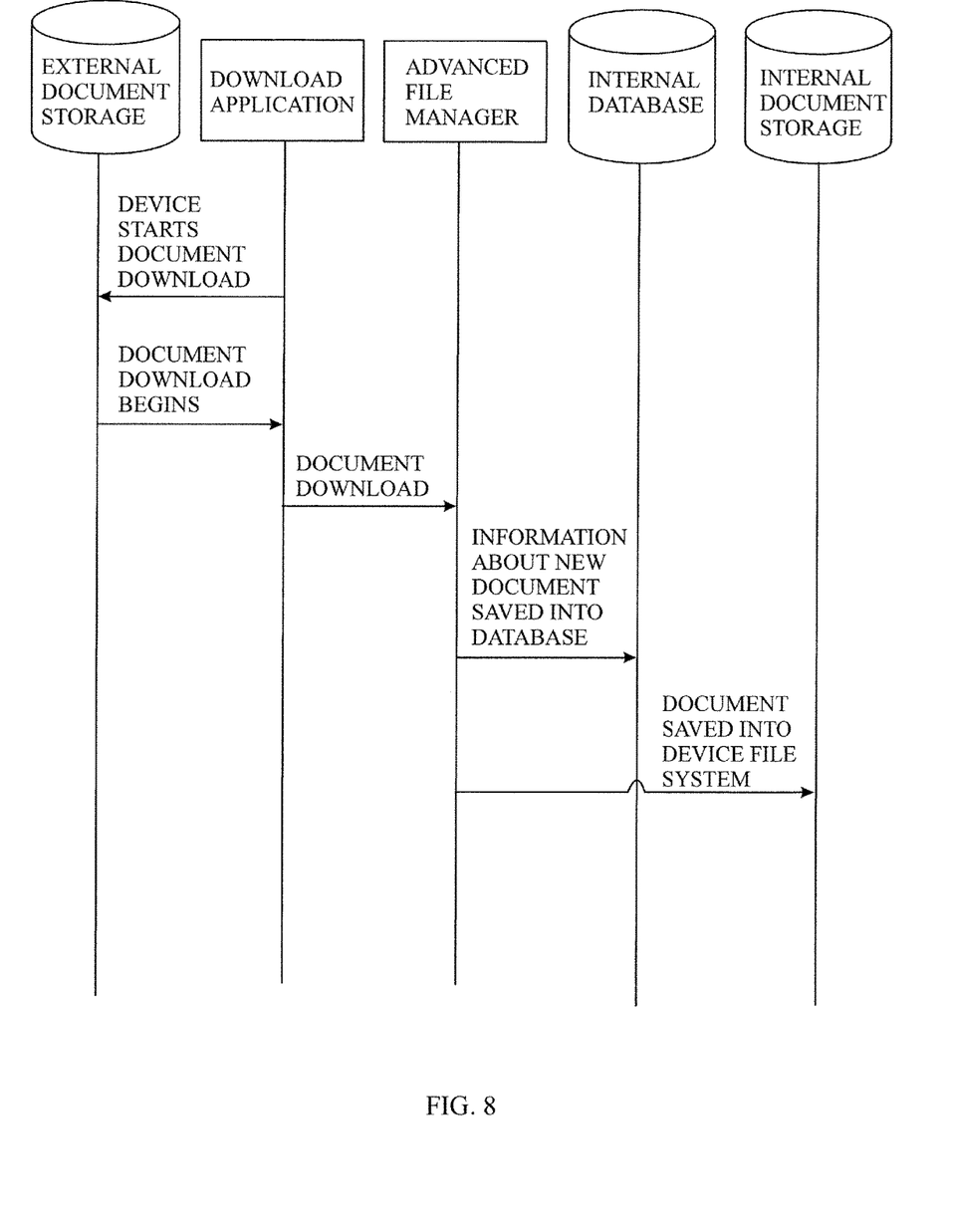
FIG. 8 illustrates an example of a message sequence where an end user downloads a new document.

FIG. 8 illustrates an example where an end user downloads a new document to his/her device. Before the document download is complete, relevant information may be added to the device internal database. A date of the document download may be one part of this information. Also the date of the file removal is defined at this moment on the basis of the policies in use.

This information and the internal database enables future management actions for the downloaded document(s).

Figure 9:
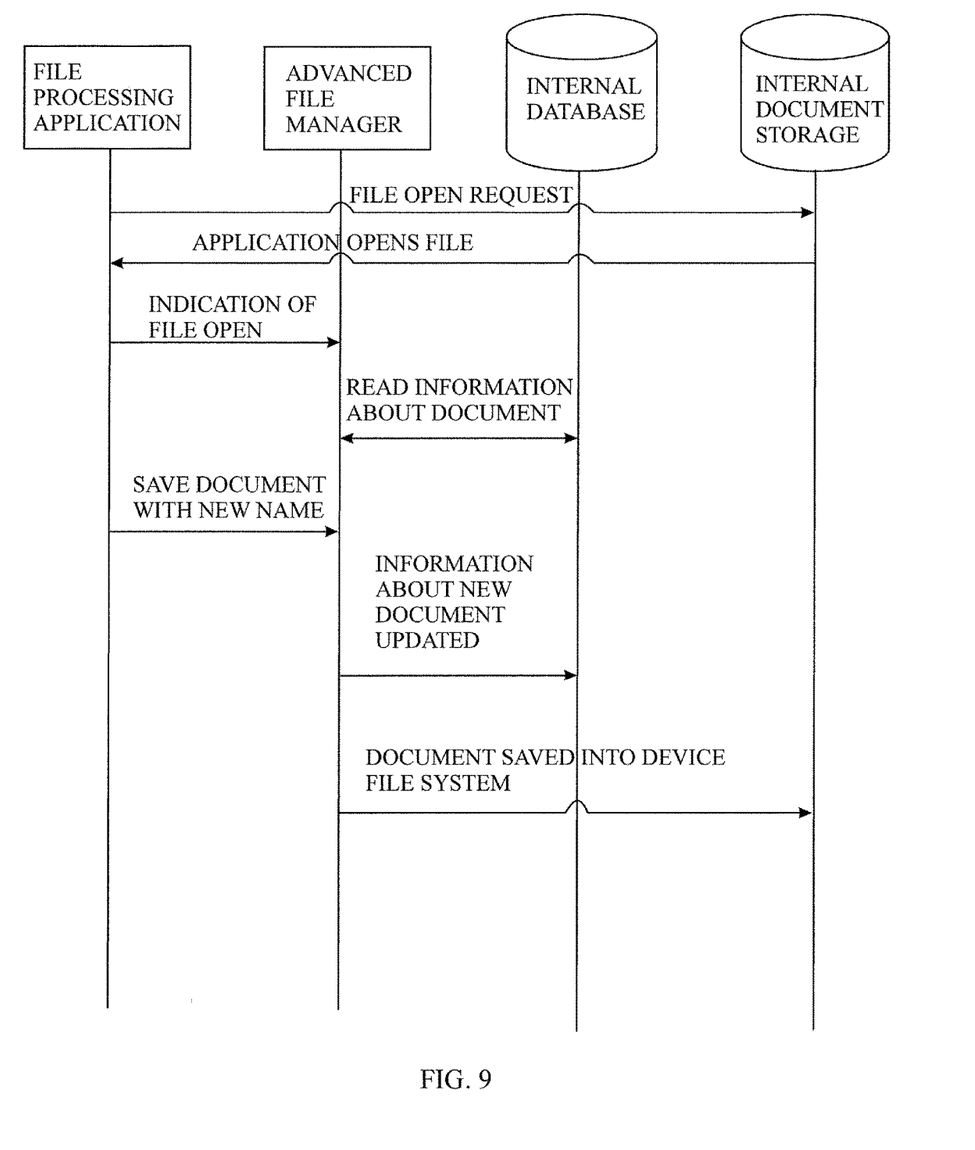
FIG. 9 illustrates an example of a message sequence where an application opens a file for editing.

FIG. 9 illustrates example message sequence for use case where a application open a file for editing. As an application opens a file, the application or an operating system may send an indication to an advanced file manager. On the basis of the indication, the advanced file manager may read the file information from the internal database. This enables the advanced file manager to keep track of open files and update related information accordingly. For example, if a file is saved with new a filename, the advanced file manager replaces its old name with a new one.

Figure 10:
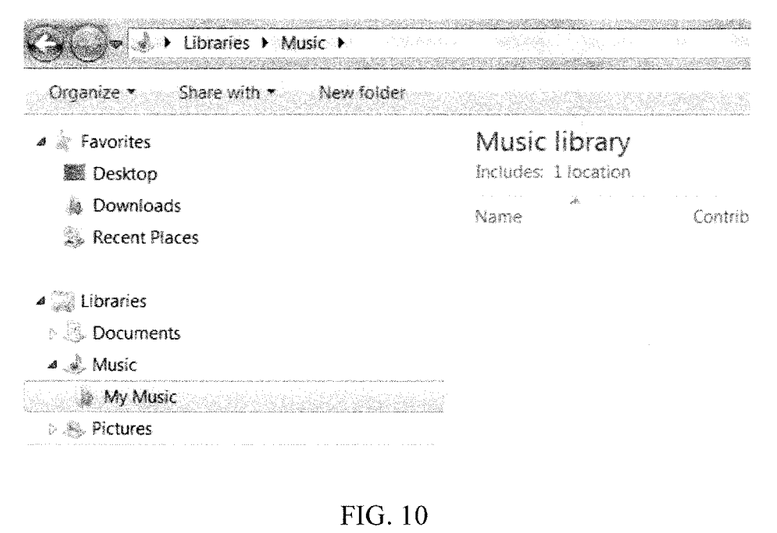
FIG. 10 illustrates an example of a Music directory before a system administrator adds new folders.

FIG. 10 illustrates an example of a directory named Music (the person here is named Jack). The operating system in this example is Windows. The system administrator adds a new folder under the Music directory. The system administrator sends a command: -m C:\Users\Jack\Music\Example\Rock. Then two folders under the Music folder are created, namely Example and Rock. And command -m C:\Users\Jack\Music\Example\Pop creates a folder named 'Pop' under 'Example'. Note also that a whole path is created with single command. As a final command the system administrator sends two commands in a row:

-m C:\Users\Jack\Music\Example\Rock\70; and
-m C:\Users\Jack\Music\Example\Rock\80.

Figure 11:
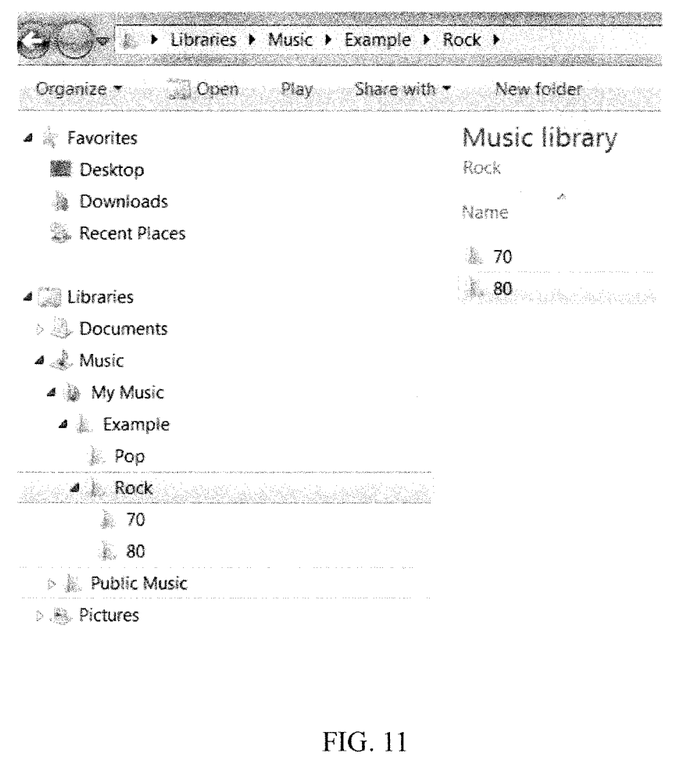
FIG. 11 illustrates an example of the Music directory after the system administrator has added new folders.

FIG. 11 illustrates an example a folder structure which is created on the basis of what is performed according to FIG. 10.

Figure 12:
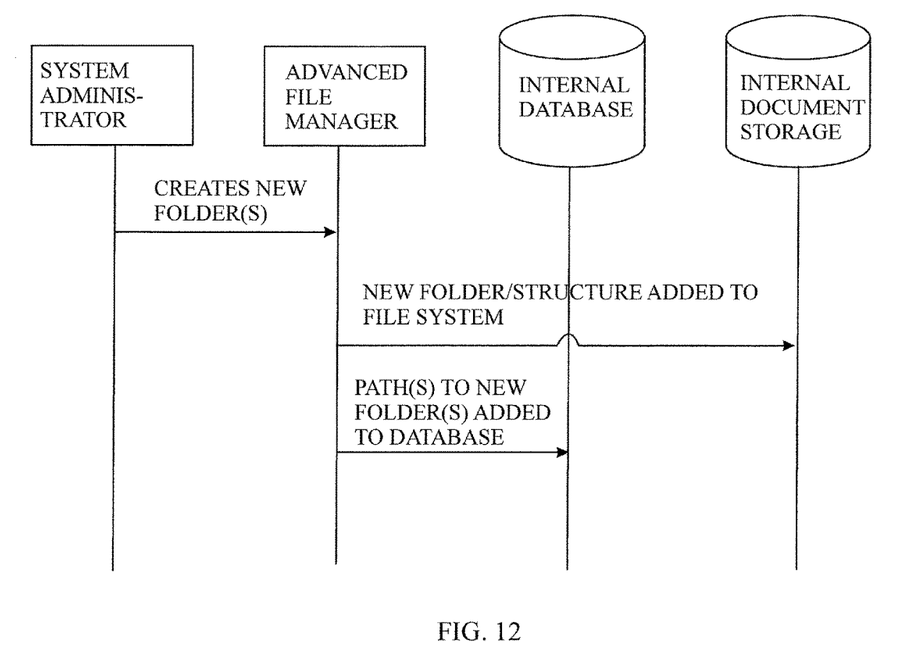
FIG. 12 illustrates an example of a message sequence where the system administrator has modified an existing folder structure.
Figure 13:
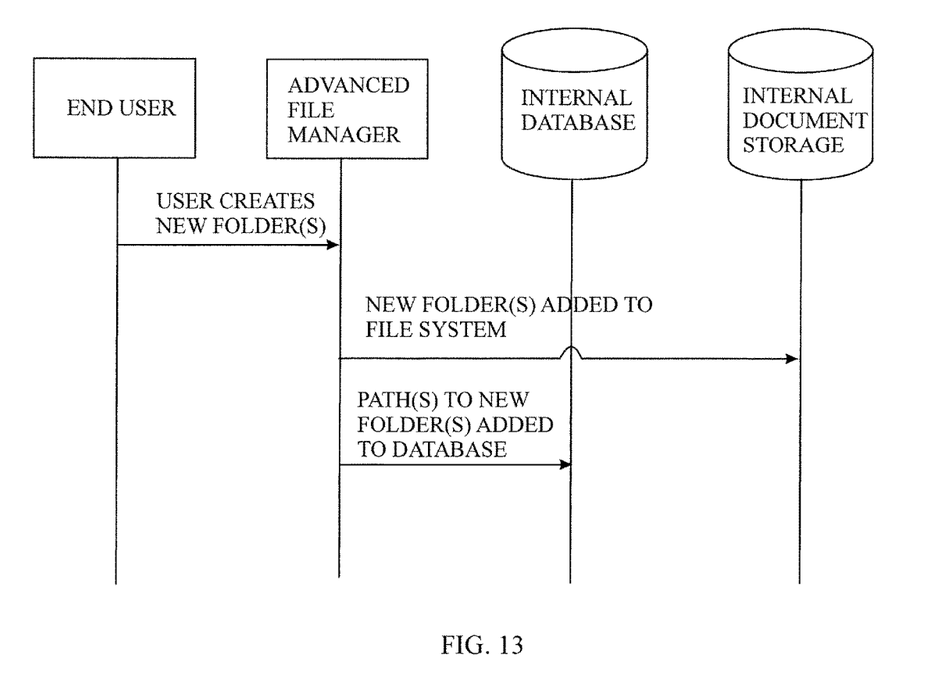
FIG. 13 illustrates an example of a message sequence where a user has modified an existing folder structure.

FIGS. 12 and 13 illustrate examples of message sequences when the system administrator (FIG. 12) or a user modifies (FIG. 13) an existing folder structure by adding a folder to a device file system. From advanced file manager point of view, it is not relevant who initiates changes, all changes are handled.

An interesting application area is a document control, especially for documents including sensitive information. Sensitive, obsolete or old information is removed at predefined time. Typical devices are desktops, laptops and mobile/handheld devices of any type.

Managing files remotely using light weight rules may also be applied to any electronic device using any file based system. Rules can be used as 'garbage collector & cleaner' i.e. apparatus file system is managed using rules. Each time rules are executed, expired files are removed and more disk space is freed to for apparatus use.

It will be obvious to a person skilled in the art that, as technology advances, the inventive concept can be implemented in various ways. The invention and its embodiments are not limited to the example embodiments described above but may vary within the scope of the claims.

What is claimed is:

1. An apparatus for managing files, wherein the apparatus comprises:
   one or more processors; and
   one or more memories including computer program code and user files, a file managing application and device management policy data,
   wherein the apparatus, the one or more memories and the computer program code with the one or more processors are configured to perform operations comprising:
      receiving deadline data associated with at least one user file from a remote administration system, the deadline data including at least one time limit defining a latest date that the at least one user file stored in a plurality of memories of the apparatus can be accessed by at least one user; and
      storing the received deadline data in the device management policy data separate from the at least one user file,
   wherein the file managing application is configured to make said at least one user file inoperable in the plurality of memories of the apparatus at and after the time limit defined by the deadline data so that said at least one user does not have access to said at least one user file in the plurality of memories of the apparatus,
   wherein the at least one user file is associated with user identification data, time limits associated with the at least one user file being different for at least two users based on different user identification data associated with the at least two users, the at least one user file being common to the at least two users.

2. The apparatus of claim 1, wherein the at least one time limit is associated with one or more unique file types.

3. The apparatus of claim 1, wherein the at least one time limit is associated with one or more specific symbol sequences in a file name.

4. The apparatus of claim 1, wherein each of the at least one time limit is associated with a unique folder structure, the file managing application being configured to the make inoperable all user files in said unique folder structure.

5. The apparatus of claim 1, wherein the file managing application is configured to delete said at least one user file in the apparatus at the time limit defined by the deadline data.

6. The apparatus of claim 1, wherein the apparatus comprises a user interface, the apparatus being configured to receive user generated deadline data through the interface, the user generated deadline data including at least one user defined time limit for use of the at least one user file stored in the apparatus, the file managing application being configured to make said at least one user file inoperable in the apparatus at and after the user defined time limit, if the user defined time limit is at or prior to the time limit received from the remote administration system.

7. The apparatus of claim 1, wherein each of the at least one user file stored in the apparatus is a user generated file.

8. The apparatus of claim 1, wherein the apparatus is configured to perform operations comprising:
   requiring user authorization prior to allowance of access to the apparatus;
   allowing access to the apparatus in response to reception of a user identification data which fulfils a requirement of the user authorization;
   associating the at least one user file generated by the user subsequent to the user authorization with the user identification; and
   making inoperable, on the basis of the deadline data, the at least one user file associated with said user identification, time limits associated with a user file being different for at least two users based on different user identification data associated with the at least two users, the user file being common to the at least two users.

9. A method for managing files, wherein the method comprises:
   receiving, by an apparatus, deadline data associated with at least one user file from a remote administration system, the deadline data including at least one time limit defining a latest date that the at least one user file stored in a plurality of memories of the apparatus can be accessed by at least one user; and
   storing the received deadline data in the device management policy data separate from the at least one user file; and
   making, by a file managing application, said at least one user file inoperable in the plurality of memories of the apparatus at and after the time limit defined by the deadline data so that said at least one user does not have access to said at least one user file in the plurality of memories of the apparatus,
   wherein the at least one user file is associated with user identification data, time limits associated with the at least one user file being different for at least two users based on different user identification data associated with the at least two users, the at least one user file being common to the at least two users.

10. The method of claim 9, wherein the method further comprises:
    receiving user generated deadline data through an interface of the apparatus, the user generated deadline data including at least one user defined time limit for use of the at least one user file stored in the apparatus; and
    making, by the file managing application, said at least one user file inoperable in the apparatus at and after the user defined time limit, if the user defined time limit is at or prior to the time limit received from the remote administration system.

11. The method of claim 9, wherein the method further comprises:
    requiring, by the apparatus, user authorization prior to allowance of access to the apparatus;
    allowing access to the apparatus in response to reception of a user identification data which fulfils a requirement of the user authorization;
    associating the at least one user file generated by the user subsequent to the user authorization with the user identification; and making inoperable, on the basis of the deadline data, the at least one user file associated with said user identification, time limits associated with a user file being different for at least two users based on different user identification data associated with the at least two users, the user file being common to the at least two users.

\* \* \* \* \*